US006871527B2

(12) United States Patent
Hansma et al.

(10) Patent No.: US 6,871,527 B2
(45) Date of Patent: Mar. 29, 2005

(54) MEASUREMENT HEAD FOR ATOMIC FORCE MICROSCOPY AND OTHER APPLICATIONS

(75) Inventors: Paul K. Hansma, Isla Vista, CA (US); Barney Drake, Reno, NV (US); James Thompson, Ithaca, NY (US); Johannes H. Kindt, Santa Barabara, CA (US); David Hale, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 173 days.

(21) Appl. No.: 10/197,771

(22) Filed: Jul. 17, 2002

(65) Prior Publication Data
US 2003/0015653 A1 Jan. 23, 2003

Related U.S. Application Data
(60) Provisional application No. 60/306,578, filed on Jul. 18, 2001.

(51) Int. Cl.[7] .............................. G01B 5/28; G01N 13/16
(52) U.S. Cl. .......................... 73/105; 250/306; 250/307
(58) Field of Search ........................ 73/105; 250/306, 250/307

(56) References Cited

U.S. PATENT DOCUMENTS

| | | | |
|---|---|---|---|
| 4,800,274 A | | 1/1989 | Hansma et al. |
| 5,260,824 A | * | 11/1993 | Okada et al. ............... 359/368 |
| RE34,489 E | | 12/1993 | Hansma et al. |
| 5,825,020 A | | 10/1998 | Hansma et al. |
| 5,874,669 A | * | 2/1999 | Ray ............................ 73/105 |
| 6,021,665 A | * | 2/2000 | Hayashi et al. ............. 73/105 |

OTHER PUBLICATIONS

Mario B. Viani, et al., "Small cantilevers for force spectroscopy of single molecules;" Journal of Applied Physics, vol. 86, No. 4, pp. 2258–2262.
Tilman E. Schaffer, et al., "Characterization and optimization of the detection sensitivity of an atomic force microscope for small cantilevers;" Journal of Applied Physics, vol. 84, No. 9, pp. 4661–4666.
Tilman E. Schaffer, et al., "An atomic force microscope for small cantilevers;" SPIE—The International Society for Optical Engineering, vol. 3009, pp. 48–52.
D.A. Walters, et al., "Short cantilevers for atomic force microscopy;" Review of Scientific Instrumentation, vol. 67, No. 10, pp. 3583–3590.
T.E. Schaffer, et al., "Studies of vibrating atomic force microscope cantilevers in liquid;" Journal of Applied Physics, vol. 80, No. 7, pp. 3622–3627.
Deron A. Walters, et al, "Atomic force microscopy using small cantilevers;" SPIE—The International Society for Optical Engineering, vol. 3009, pp. 43–47.
M. B. Viani et al., Fast Imaging and fast force spectroscopy of single biopolymers with a new atomic force microscope designed for small cantilevers, Rev. Sci. Instrum., vol. 70. No. 11, Nov., 1999.

* cited by examiner

Primary Examiner—Daniel S. Larkin
(74) Attorney, Agent, or Firm—Fulbright & Jaworski

(57) ABSTRACT

An improvement for atomic force microscopes, more generally for light beam detecting systems, but also in part applicable to scanning probe microscopes, providing significant novel features and advantages. Particular features include using different objective lens regions for incident and reflected light, a flexure that allows three dimensional motion of the optics block, forming the housing and optics block of a composite material or ceramic, arranging the components so that the beam never hits a flat surface at normal incidence, and providing a resonant frequency of cantilever vibration greater than 850 HZ between the cantilever and sample and the cantilever and focusing lens.

23 Claims, 11 Drawing Sheets

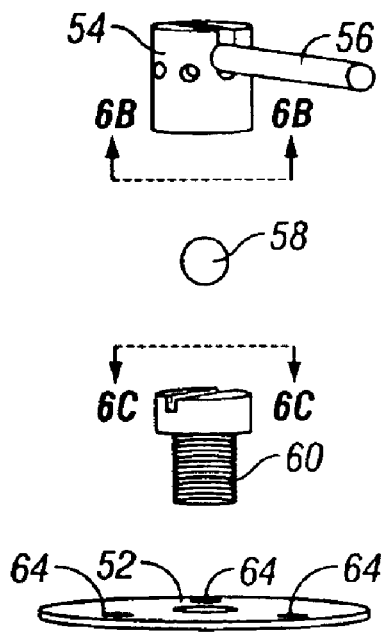
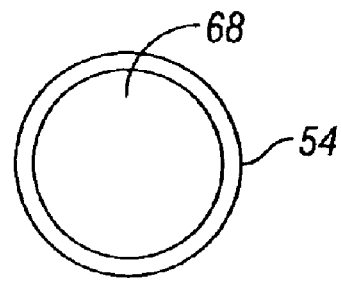
FIG. 6B
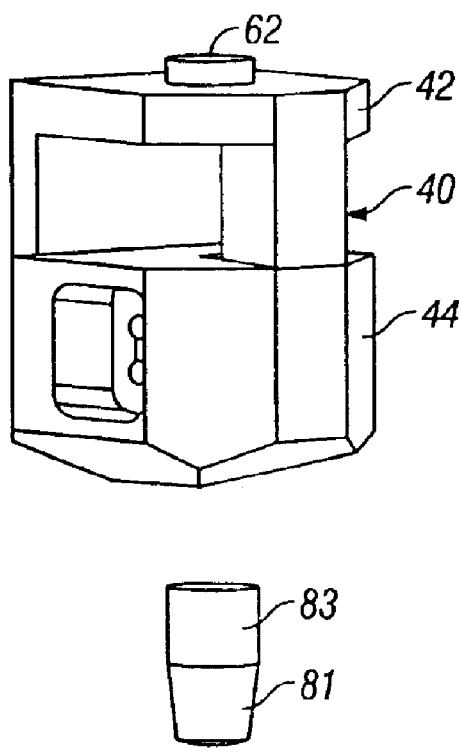
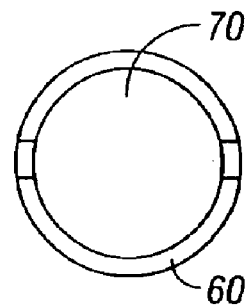
FIG. 6C
FIG. 6A

MEASUREMENT HEAD FOR ATOMIC FORCE MICROSCOPY AND OTHER APPLICATIONS

CROSS REFERENCE TO RELATED APPLICATION

This application is based on U.S. application Ser. No. 60/306,578, filed Jul. 18, 2001.

STATEMENT REGARDING FEDERALLY SPONSORED RESEARCH AND DEVELOPMENT

This invention was made with Government support under Grant No. NSF-DMR9988640 AND NSF-DMR0080034 awarded by the National Science Foundation. The Government has certain rights in this invention.

FIELD OF THE INVENTION

This invention relates to the field of scanning probe devices. More particularly, the invention relates to improvements in an atomic force microscope used to measure the deflections of a cantilever.

BACKGROUND OF THE INVENTION

Scanning probe devices, such as the atomic force microscope (AFM) have proven to be excellent tools for imaging a wide range of materials, such as metals, semiconductors, minerals, polymers, and biomaterials. In an AFM, forces are measured by means of a cantilever that deflects when forces act on it. The deflection of the cantilever is sensed by a detection system, commonly by focusing an incident beam as a spot onto the cantilever and directing the reflected beam onto a segmented detector. Specialized AFMs called "force pullers" have been built for the purpose of pulling on molecules to determine the structure and dynamics of those molecules. AFM-like cantilevers and cantilever arrays have also been used recently as chemical sensing devices. In this mode of operation, a chemically sensitive layer is applied to one of more surfaces of the cantilever. When a target molecule is detected, the cantilever's nanomechanical properties are affected—i.e., the deflection and/or resonant frequency of the cantilever will change.

Since its introduction, the AFM and cantilever sensing devices have become increasingly more advanced, measuring decreasingly smaller forces and utilizing decreasingly smaller cantilevers. This has introduced problems relating to the sensitivity of the instrument. There is a need to provide greater sensitivity and a smaller spot size to accommodate the smaller cantilevers and smaller forces that scientific investigators need to either measure samples or manipulate them. Similar detection techniques are also used to monitor the motion of the optical probes used in Near-Field Scanning Optical Microscopes (NSOM), the scanning ion-conductance microscope (SICM), and a variety of other scanning probe microscopes. The growing field of nanotechnology also provides ample motivation for the precision measurement of the position and/or motion of a wide variety of objects down to the nanometer scale and below.

The following U.S. patents are relevant to this invention: U.S. Pat. No. 5,825,020—Atomic force microscope for generating a small incident beam spot, U.S. Pat. No. RE034489—Atomic force microscope with optional replaceable fluid cell, and U.S. Pat. No. 4,800,274—High resolution atomic force microscope. The following publications are relevant to this invention: (1) Mario B. Viani, et al., "Small cantilevers for force spectroscopy of single molecules;" Journal of Applied Physics, Volume 86, Number 4, pp. 2258–2262. (2) Tilman E. Schaffer, et al., "Characterization and optimization of the detection sensitivity of an atomic force microscope for small cantilevers;" Journal of Applied Physics, Volume 84, Number 9, pp. 4661–4666. (3) Tilman E. Schaffer, et al., "An atomic force microscope for small cantilevers;" SPIE—The International Society for Optical Engineering, Volume 3009, pp. 48–52. (4) D. A. Walters, et at., "Short cantilevers for atomic force microscopy;" Review of Scientific Instrumentation, Volume 67, Number 10, pp. 3583–3590. (5) T. E. Schaffer, et al, "Studies of vibrating atomic force microscope cantilevers in liquid;" Journal of Applied Physics, Volume 80, Number 7, pp. 3622–3627. (6) Deron A. Walters, et al, "Atomic force microscopy using small cantilevers;" SPIE—The International Society for Optical Engineering, Volume 3009, pp. 43–47. The foregoing patents and publications are all incorporated herein by reference.

SUMMARY OF THE INVENTION

The present invention provides improvements for the optical tracking and detection of reflected light beams that has general application to any optical system for measuring the motion of a cantilever, and specific application to AFMs. In particular, the present invention provides an improved AFM head that has significant novel features and advantages over existing AFM heads. A particular novel feature is the use of a novel optical path wherein different regions of an objective lens are used for incident and reflected light. A second novel feature of this AFM is the unified optics block that contains all the optical elements of the optical lever detection system between and encompassing the light source and the final focusing lens in an extremely small and rigid package. Another novel feature is that the beam from the AFM light source never hits a flat surface at normal incidence except when it is strongly diverging or converging. A further novel feature is a three dimensional flexure to allow three dimensional motion of the optics block. Another novel feature is enabling resonant frequencies of greater than 850 Hz for two mechanical paths that most affect the performance of the AFM: the mechanical paths from the cantilever to the sample, and between the cantilever and the focusing lens. This is aided by kinematically indexing the cantilever holder directly to the top of the piezoelectric scanner to provide a direct mechanical path between the sample on top of the scanner and the cantilever. Still another novel feature, which improves both AFMs and STMs and other scanning probe microscopes, is the use of composite materials or ceramics for making housings, optics blocks, and other components of scanning probe microscopes, providing desired high stiffness and a low thermal expansion coefficient.

As a result of the use of one or more of these features, an AFM is achievable with a smaller focused spot not heretofore possible. In a particular embodiment of the invention, an improvement to an AFM is provided in which the incident beam is focused to form a spot on the cantilever having a size of 5 $\mu$m or less, preferably 3 $\mu$m or less, in at least one dimension.

Many of the improvements of this invention are applicable to optical systems broadly that measure the motion or position of a nanomechanical object, or of a nano size feature or structure of an object.

These and other aspects and advantages of the present invention will become better understood with regard to the following detailed description and accompanying drawings.

BRIEF DESCRIPTION OF THE DRAWINGS

FIG. 6A is an exploded perspective view of the optics block and flexure components;

FIG. 6B is a plan view showing the ball contact surface of a vertically movable focus member used in the invention;

FIG. 6C is a plan view showing the ball contact surface of a socket of a disk flexure used in the invention;

DETAILED DESCRIPTION OF THE INVENTION

Figure 1:
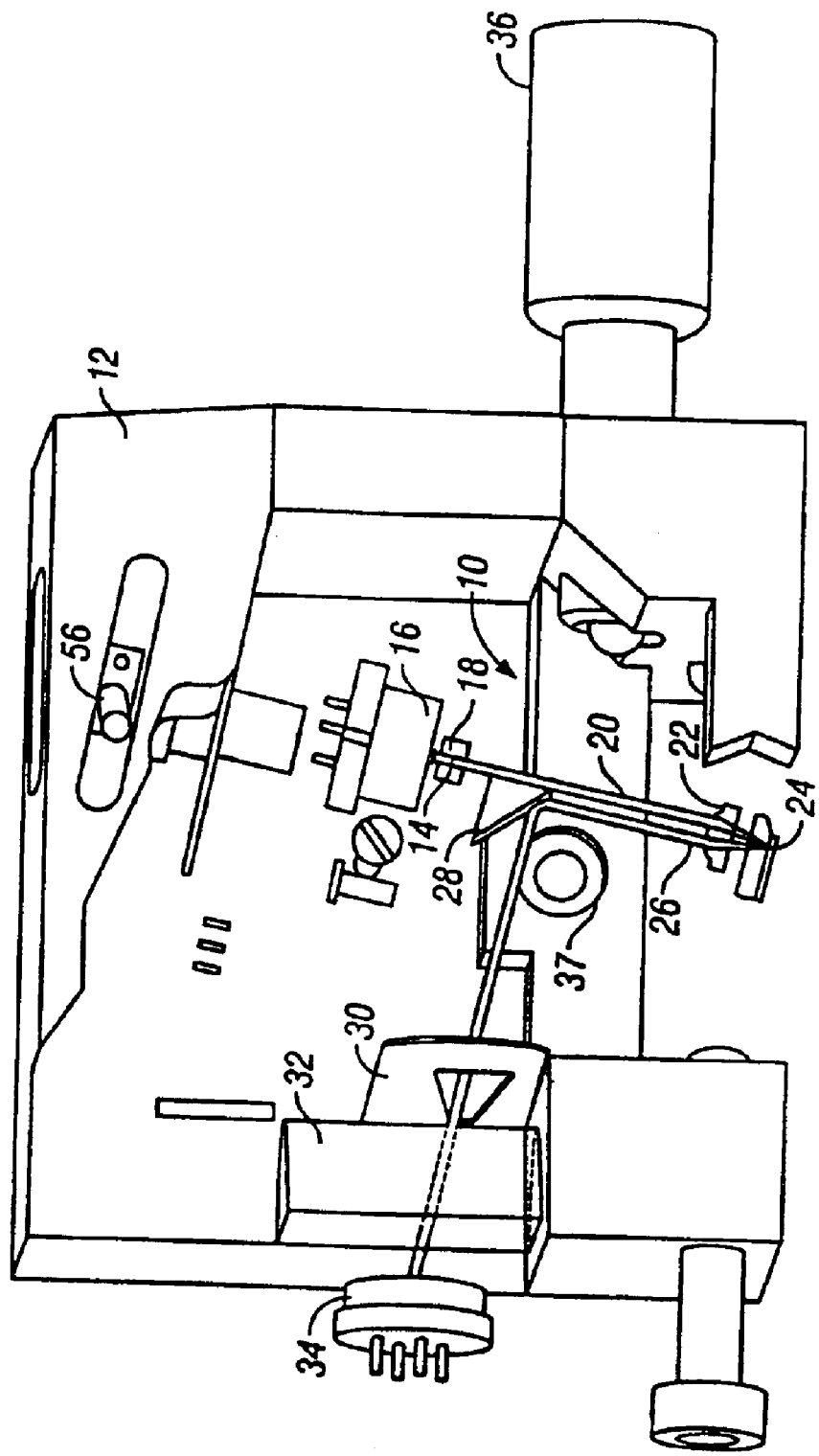
FIG. 1 is a perspective view of the optical path of one embodiment of the invention and associated components and cut-away portions of the housing of a measurement head, for example for an atomic force microscope of this invention.

In accordance with an embodiment of this invention, a measurement head is provided that can be used to measure the deflections of a cantilever and other nanomechanical devices and features. The most common application of this measurement head is as the detection head of an atomic force microscope, but this measurement head can also be used to make precise measurements of the motion of any nano size feature or structure or nanomechanical object, that is a feature or object where the motions on the nanometer scale are important for the operation of the device. Further, many of the principals of this measurement head can be used to provide an improved capability to measure the vertical and/or lateral motion of arbitrary objects at the nanometer scale.

These deflections are related to the force on the cantilever and can be used for measuring forces vs. distance curves, for measuring a force to be controlled by a feedback network during imaging and for the many uses that have been already established for previous atomic force microscope heads including magnetic force microscopy, Kelvin probe microscopy, non-contact AFM, and any other device for which measurements of cantilever deflection are needed.

Specifically, the invention provides one or more of the following improvements, all of which are applicable to an AFM, some to optical systems more generally, and others to scanning probe microscopes in general such as AFMs and STMs. The improvements, which are illustrated with regard to an AFM, are:

I. The incident laser beam is not aligned with the central axis of the lens.

II. A small, stiff integrated optics block contains and encompasses all optical elements from the light source to the final focusing lens.

III. A flexure allows three dimensional motion of the optics block.

IV. Composite materials or ceramics are used.

V. The beam never hits a flat surface at normal incidence except when converging or diverging.

VI. The critical mechanical paths between the cantilever and the sample and between the cantilever and the focusing lens have resonant frequencies enabled greater than 850 Hz.

VII. The incident beam forms a 3 $\mu$m or less spot.

This invention includes several other innovations that are described at appropriate places hereinafter.

I. The Incident Laser Beam Is Not Aligned with the Central Axis of the Lens.

One of the key challenges of a small cantilever AFM measurement head is the separation of the incoming and reflected light beams. The reason this is an issue is that small cantilever AFMs require high numerical aperture (NA) optics to form a small focused light spot on the cantilever. The high numerical aperture optics typically mean that a short focal length lens is placed very close to the cantilever. This leaves little space for the light beam reflected off the cantilever to pass to the detector. The previously mentioned U.S. Pat. No. 5,825,020 provides one method for separating the incoming and outgoing beams. The incoming beam is polarized, passed through the focus lens, reflected off the cantilever back through the same focus lens and then the reflected beam is directed on a separate path using a quarter wave plate.

The current invention solves this problem in a different and unique way, without the need for a quarter wave plate, as discussed below. FIGS. 1 and 2 illustrate the optical system 10 contained in a housing 12 of an AFM in accordance with the present invention. A light beam 14 from a light source 16 passes through a collimating lens 18. The light source may be a laser diode, a helium neon laser, a laser or laser diode coupled to an optical fiber, a vertical cavity surface emitting laser, a super-luminescent diode or light emitting diode, or other source that creates a beam of light. In the case of a solid state light source, ideally the source should have a very small emitting area, on the scale of 30 $\mu$m or less.

After leaving the collimating lens 18, the light beam continues as an incident beam 20 through one half of an objective lens 22 that focuses it onto a cantilever 24. The optical system 10 can be used as shown for operation in air, other gases, or vacuum. A glass cantilever holder similar to that in U.S. Pat. No. B1 Re 34,489 can also be used to allow the detection system to measure the motion of cantilevers submerged in fluid. Upon leaving the cantilever 24, the reflected beam 26 passes through the other half of the objective lens 22 on its way to the detector. There are other optional components between the objective lens 22 and the detector that will be discussed shortly. The present invention thus provides for a very simple and compact way to separate the incoming and outgoing light beams. Since the incoming beam 20 strikes the objective lens 22 off the central axis of the lens, the light beam leaves the lens at a non-zero angle with respect to the optical axis of the lens. If the cantilever is held perpendicular to the optical axis, as in the preferred embodiment, the outgoing light beam 26 reflected off the cantilever also makes a similar angle with respect to the optical axis. Together these two non-zero angles provide the clearance between the incoming and outgoing light beams to be separated. In the preferred embodiment, there is substantially no overlap between the incident beam 20 and reflected beam 26. If the incident beam 20 is placed fairly far off the central axis of the lens 22, then the beam leaving the lens to the cantilever traverses at a fairly steep angle. This has other advantages in an AFM as it causes any stray light reflecting or scattering off the sample to be directed along a path that is less likely to strike the detector. This stray light can cause optical interference in the AFM measurements and is discussed further below.

Figure 2A:
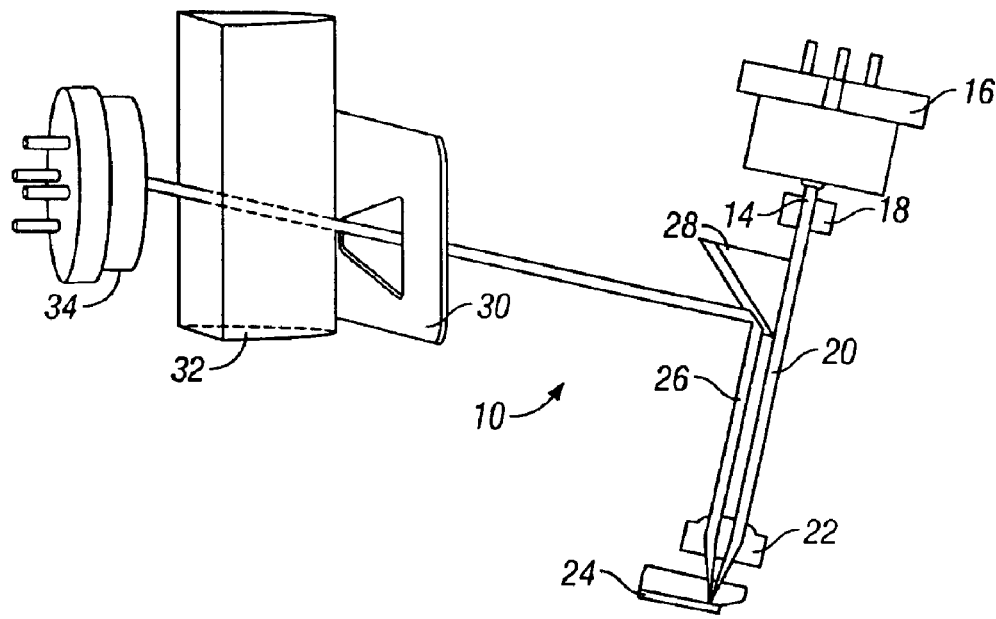
FIG. 2A is a perspective view of the optical path of FIG. 1 and associated components, shown outside the housing.
Figure 2B:
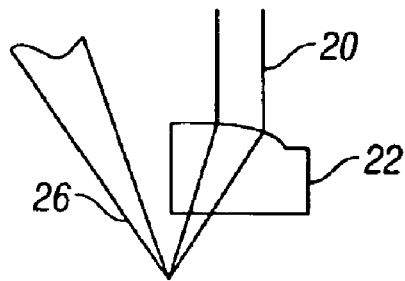
FIGS. 2B, 2C, and 2D are schematic close-up views of alternative embodiments of the optical measurement heads.
Figure 2C:
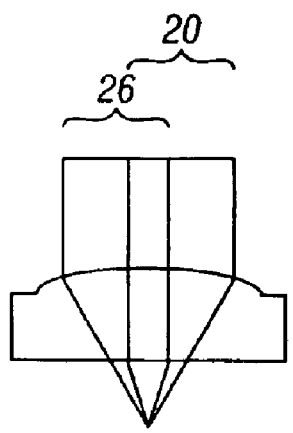
Figure 2D:
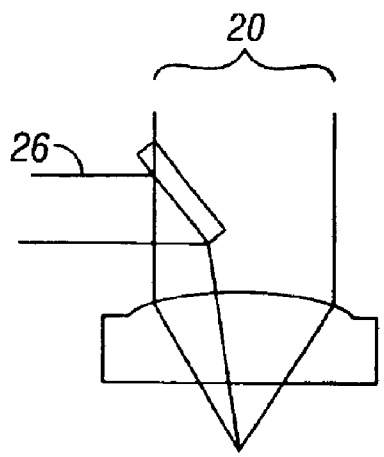

In the preferred embodiment, as shown in FIG. 2A, the position of the incoming light beam 20 on the objective lens 22 is selected such that there is no overlap between the incoming beam 20 and the outgoing beam 26. There are many similar embodiments that fall within the scope of the current invention. For example, in FIG. 2B, the objective lens 22 is cut roughly in half such that the reflected beam 26 does not pass back through the lens. In another non-preferred embodiment, as shown in FIG. 2C, the incoming and outgoing beams are arranged to have a slight overlap. This embodiment may provide for a higher NA light beam, resulting in a smaller focused spot, and/or may allow for the use of a smaller objective lens. A fourth alternative embodiment is shown in FIG. 2D. In this embodiment, the incoming beam is arranged roughly aligned with the central axis of the lens. In this case, however, a beam splitter or mirror is placed in the path of the incoming beam, partially blocking the incoming beam. Then, a portion of the reflected beam is directed by the beam splitter or mirror off to a detector. Of course there are many variations of this concept within the scope of the present invention that can create a similar result.

Referring back to the preferred embodiment of FIG. 2A, after the outgoing light beam 26 leaves the objective lens 22, it then reflects from a small mirror 28, passes through an optional interference shield 30, then an optional cylindrical lens 32, to hit a detector 34. The optional interference shield 30 is positioned to pass the primary beam 26 reflected from the cantilever 24 and block other light. Ideally, the shield 30 is non-reflective and absorbing to minimize scattering and/or reflection of stray light. Stray light can come from multiple sources, including ambient light and light from the detector light beam that is scattered or reflected off of optical surfaces and/or the surfaces of mechanical housing components. The interference shield blocks this stray light and decreases the interference effects that are otherwise visible as a wave in force vs. distance curves. The small mirror 28 may also be a small prism where total internal reflection is used to redirect the beam. The optional cylindrical lens is used to focus or otherwise constrain the size of the light beam in the axis perpendicular to the motion of the motion of the light beam in response to the bend of the cantilever.

II. An Integrated Optics Block.

Figure 3:
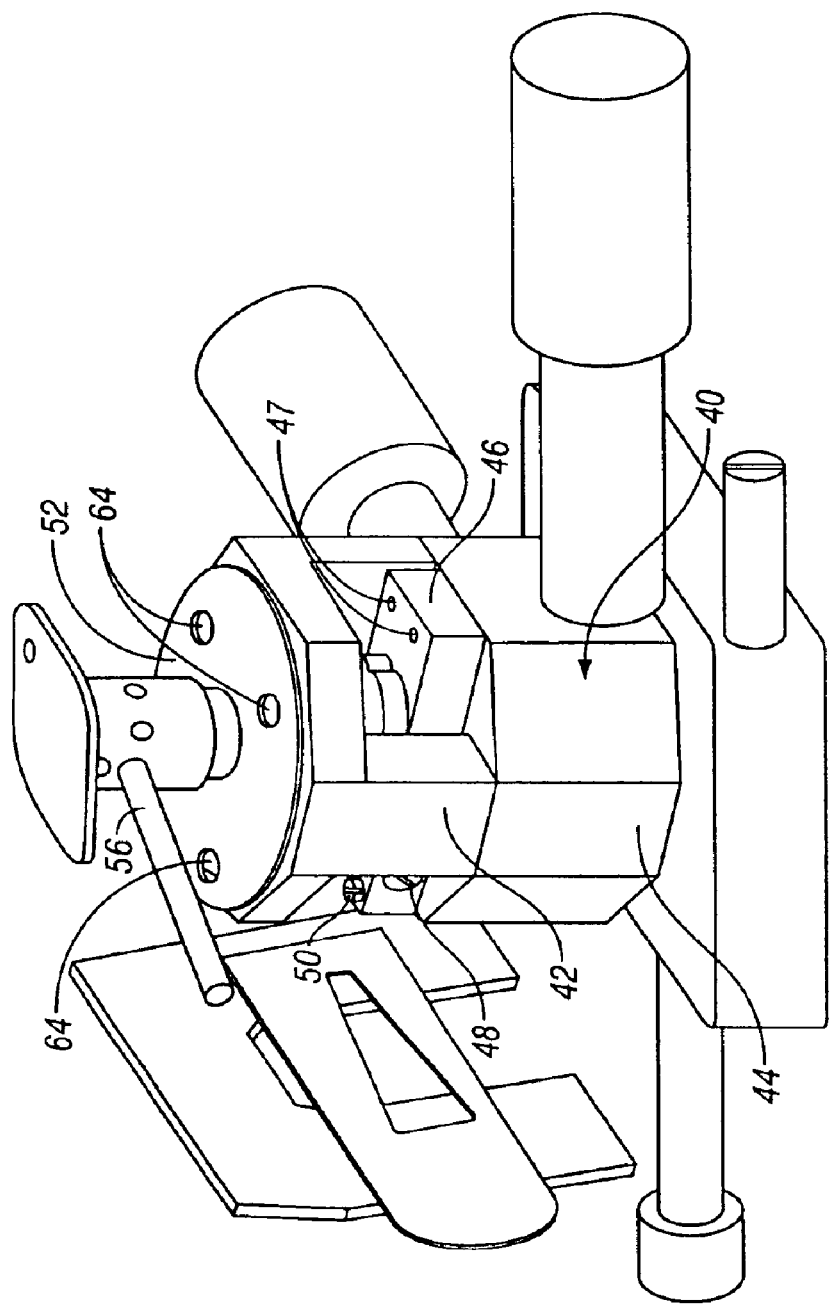
FIG. 3 is a perspective side view of a unified optics block enclosing the components of FIG. 1.

FIG. 3 shows the components of FIG. 1 held in a unified optics block 40. The optics blocks contains all optical elements between arid encompassing the light source and the final focus lens. Providing these components in a single integrated block allows the placement of the enclosed optical elements to be optimized and then optionally locked in place. This arrangement allows the critical optical components that contribute to the performance of this measurement head to remain fixed relative to each other and hence the optical performance is not affected by user adjustments. Prior art small cantilever AFM measurement heads, such as the one in U.S. Pat. No. 5,825,020 position the focused spot onto the AFM cantilever by translating at least one lens relative to one or more other lens in the optical path. For example, consider FIG. 7 of the U.S. Pat. No. 5,825,020. In this figure, adjustment of screw 72 moves the lens 62 relative to the final focus lens 60 to translate the focused spot. Similarly, screws 184 and 186 of FIG. 9 translates the light source relative to many other optical elements. This arrangement causes a degradation of the optical performance because the collimated laser beam will traverse through different sections of the focusing lenses and can strike the lenses at non-optimal angles. This results in changes in the laser spot size as the position of the laser spot is adjusted by the user.

The integrated optics block 40 of the current invention offers an improvement over the prior art because all the critical optical elements move together as the focus spot is steered to the cantilever. (The steering mechanism, a 3-dimensional flexure, is discussed in the next section.) As such, this technique allows the measurement head to maintain a smaller focus over the entire adjustment range of the measurement head. This optics block can also be optionally filled with a gas having an index of refraction that is stable with changes in temperature and then sealed. This prevents distortions of the light beams as the temperature of the surrounding air changes.

The integrated optics block 40, in the preferred embodiment, consists of a bridge piece 42 that is attached to the main body 44 by adhesive. The bridge and main body may also be attached by any arbitrary method of fastening the two components together. The bridge 42 and base 44 may also be machined or formed out of a single piece. The bridge 42 provides the mating interface for an innovative 3-dimensional flexure, described in the next section, that allows the light beam to be steered to the cantilever. In the preferred embodiment, the light source 16 is mounted under the bridge piece 42. Further details of the integrated optics block will be detailed in sections III and IV.

III. A Flexure Allows Three Dimensional Motion of the Optics Block.

The optics block 40 is attached to the housing 12 with a novel, three-dimensional, disk flexure 52. This flexure is designed to allow the optics block to be pivoted in two axes around a point on the central axis of the light source to steer the focused spot onto a cantilever other nanomechanical object. The 3D flexure also allows the optics block to be independently translated in one dimension along the axis of the light source. This allows for a focus adjustment, i.e., aligning height of the focused spot to the plane of the cantilever or other nanomechanical object.

Figure 4:
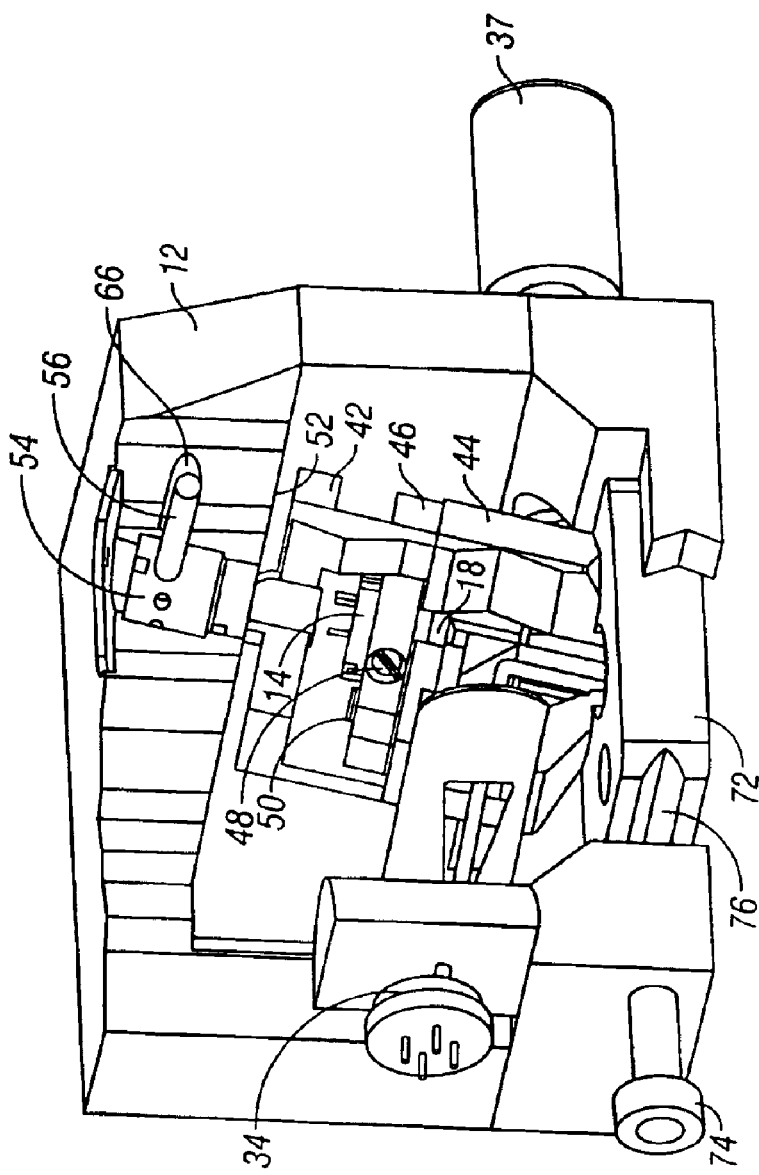
FIG. 4 is a view of FIG. 3 from a different angle with portions cut-away to show details of the optics block.
Figure 5:
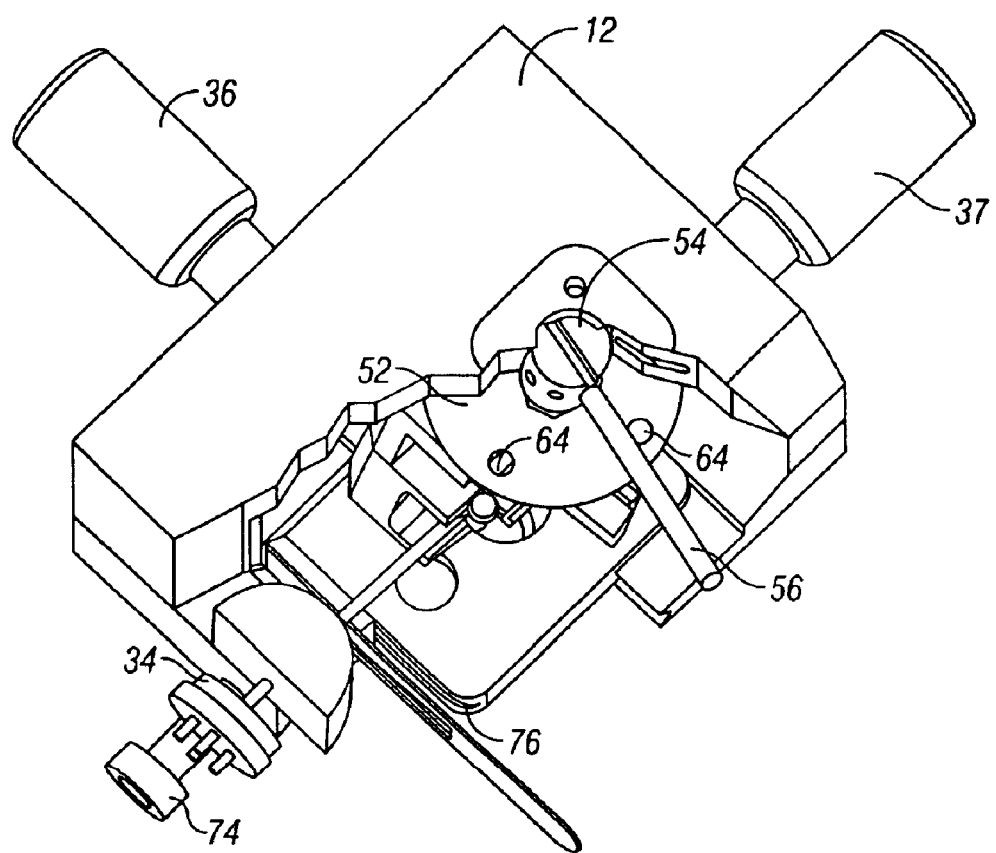
FIG. 5 is a top view of the microscope with the housing partially cut away and showing lateral positioning screws.

In the preferred embodiment, the disk flexure is made of steel, but it can also be made from other metals like aluminum, copper, beryllium copper, or titanium, or other materials with sufficient stiffness. A vertically movable focus member 54, in the form of a fine pitched screw as shown in FIGS. 4 and 5, pushes on the center of the flexure 52 via a stainless steel or other precision ball 58 and a threaded socket 60, as shown in FIG. 6A, to keep the force centered. The disk flexure 52 is in the form of a flat circular plate in the preferred embodiment. In alternate embodiments, the disk flexure may have cutouts to reduce the spring constant and hence increase the travel in the flexure motion directions. The flexure also need not be circular, but should be much stiffer against in-plane motion compared to out-of-plane motion.

The threaded socket 60, as shown in FIG. 6A, centrally secures the disk flexure to the optics block 40 by threading into a correspondingly threaded nut 62 fixed to the top of the optics block 40. In the preferred embodiment, the disk flexure 52 is secured to the housing 12 laterally distal from the nut 62 at a plurality of locations 64 along its periphery using fasteners, such as screws. Alternately, the periphery of the disk flexure 52 may be secured in a variety of other ways, for example welded, held in place by a clamping ring, adhesive, or other similar means. By having the ball 58 received between opposing surfaces of the vertically movable focus member 54 and the socket 60 of the disk flexure 52, lateral translation of the optics block 40 is prevented while allowing the optics block 40 to move up and down vertically and to pivot relative to the housing 12.

A fine focus lever 56 is connected to the vertically movable focus member 54 extending therefrom to enable fine focus vertical movement of the optics block 40. The housing 12 is formed with an elongate lateral slot 66 through which the fine focus lever 56 extends.

Referring to FIGS. 6A and 6B, one or both of the opposing confronting surfaces of the focus member 54 and the socket 60 of the disk flexure 52 can be provided with a sapphire coating, respectively 68 and 70, for smooth rolling contact with the ball 58.

The foregoing arrangement of the vertically movable fine focus member 54 centrally connected by the smoothly rolling ball 58 to the disk flexure 52, which in turn is secured at its periphery to the housing 12, avoids lateral motion of the optics block 40 when the lever 56 is rotated to vertically deflect the disk flexure 52, yet allows pivotal movement so that the laser beam 20 can be moved laterally to align with the cantilever 24, or with a selected one of a plurality of cantilevers.

Referring more particularly to FIGS. 4 and 5, the lever 56 acts as a fine focus mechanism because it moves the entire optics block 40 relative to the housing 12, which is rigidly attached to the cantilever holder 72 by means of a locking screw 74 that rests in a groove 76 on the cantilever holder 72. A similar groove (not shown) on the other side of the cantilever holder rests against two balls (not shown) mounted on the housing 12. This forms a semi-kinematic mount to hold the cantilever holder 72 and thus the cantilever 24 rigid relative to the housing 12. Since the lever 56 moves the optics block 40 relative to the housing 12, it thus moves the optics block 40 relative to the cantilever 24 to provide a fine focusing mechanism. Prior art AFMs often have the problem that focus adjustment also moves the spot with a parasitic lateral motion, often moving the focused spot off the cantilever during focus adjustment. In the current invention, the fine focus motion enabled by lever 56 and the innovative 3D flexure is superior to that in other prior art AFMs as it allows motion of the focal point of the optical system to be substantially constrained to a single translation axis. This allows a user to adjust the focus of the AFM measurement head while keeping the light spot on even a very small cantilever, in the range of 5 $\mu$m long.

FIGS. 3 and 5 show views of the microscope that display both lateral positioning screws. These positioning screws push on the optics block 40 to move it relative to a selected cantilever of a plurality of cantilevers (such as on a cantilever chip shown in FIG. 2 of U. S. Pat. No. 5,825,020) and thus position the laser spot on the desired cantilever. The flexure 52 can be preloaded to press firmly against the positioning screws 36 and 37. Thus, the flexure 52 can move the optics block 40 in three dimensions relative to the cantilever 24 to provide both positioning and focusing of the incident laser beam 20 on the cantilever 24. This arrangement is superior to the laser steering systems used in most AFMs. Most AFMs use a 2-axis kinematic tilt stage to steer the laser beam in two orthogonal directions. Such devices are available, for example from Newport Corporation, Melles-Griot, and many other companies. These 2-axis tilt stages have sufficient resolution that they work fine for AFMs with larger cantilevers, say longer than 50 $\mu$m. Unfortunately, they become more difficult to use for manual adjustment for very short cantilevers, especially those less than 10 $\mu$m long. The typical kinematic tilt stage has a lever arm that magnifies the motion of the focused spot compared to the motion of the adjusting actuator. This magnification (often 2× or more) requires that a user move the adjustment screw by an even smaller amount than he wishes to move the focused laser beam. The current invention offers an improved beam steering device as the two laser adjustment screws 36 and 37 are positioned very close to the bottom of the integrated optics block 40. This arrangement has two advantages. First it reduces the lever magnification of the tilt stage (to roughly 1.25 in the preferred embodiment) while keeping the tilt stage extremely compact. Second, it substantially shortens the mechanical path that controls the position of the laser spot. That is, the lateral position of the laser spot is determined by the screws that are mounted only a few millimeters above the cantilever. Referring to FIG. 4, the length of this mechanical path is limited in fact only by the diameter of the end of screws 37 (and 36 not shown) and the thickness of the cantilever holder 72.

The objective lens 22 is mounted in a threaded sleeve 81, which threads into a lens mount 83 glued to the optics block 40, as shown in FIG. 6A. By screwing the threaded sleeve 81 into the lens mount 83, a coarse focus can be obtained on the cantilever 24.

As shown in FIG. 3, there is also a relatively thick laser positioning flexure 46 that allows adjustment of the light source 16 with respect to the collimating lens 18 (shown in cutaway view in FIG. 2). The light source 16 is mounted on the laser positioning flexure 46 and clamped in place with a screw 48 or attached with adhesive. Another screw 50 is used to flex the laser positioning flexure 46 relative to the main body 44 and thus change the distance between the light source 16 and the collimating lens 18 for purposes of producing a well collimated beam or, alternately, a diverging beam or converging beam where that, together with the objective lens 22, produces a suitable spot on the cantilever 24. This well collimated beam next passes through the objective lens 22. In the preferred embodiment, this second flexure is made out of a material with high thermal conductivity so that it can act as a heat sink for any heat generated by the light source.

The second flexure can also be eliminated in alternative embodiments. In one alternative embodiment, the collimator and light source can be arranged in an assembly fixture that allows the lens and light source to be positioned at the optimal locations to form a highly collimated exit beam and then the components can be glued in place.

IV. Composite Materials or Ceramics are Used.

The foregoing parts, as well as the unified optics block 10,11 are formed of carbon composite materials. The advantage of this material is a high stiffness, which is given by the square root of its elastic modulus over its density. It also has a very low thermal expansion coefficient. Both of these qualities are very desirable for scanning probe microscopes. Other composite materials that share one or both of these advantages would also be useful for scanning probe microscopy. Thus, an embodiment of the present invention is the use of composite materials for making housings, optics blocks, scanners, and other components of scanning probe microscopes, such as AFMs and STMs.

Suitable composite materials include, but are not limited to, composites made from resin with high strength, high modulus fiber, such as fiberglass, graphite, carbon, boron, quartz and aramid fibers, i.e. aromatic polyamide fibers characterized by excellent high temperature, flame resistance, and electrical properties. Suitable composite materials are characterized by a tensile modulus of elasticity of 5 GPa to 300 GPa, which exhibit a sufficiently high thermal stability during use. In particular embodiments, the composite material has an elastic modulus of 10 GPa or higher. In a further preferred embodiment, the elastic modulus is 40 GPa or higher, and in still further preferred embodiments, the elastic modulus is 100 GPa or higher. The highest fiber strengths of the composite materials are achieved with carbon fibers. The carbon fibers may be embedded in an epoxy matrix or preferably in a graphite matrix. Orientation of the continuous fibers can be in any spatial axis, however, a semi-isotropic design in at least one plane is preferred. Some composite materials have a different thermal expansion coefficient in one axis versus the other axis. When such a material is used, it is advantageous to align the material such that the axis of lower thermal expansion is oriented along the axis of the greatest length in the mechanical path between the cantilever and the sample.

In the preferred embodiment, the inventors used a high-strength carbon-carbon composite material, consisting of carbon fibers embedded in a pyrolitic graphite matrix. The elastic modulus of carbon-carbon composites is very high, usually ranging from 15–20 GPa for composites made with 3-dimensional "fiber felt" (random orientation of fibers) to 150–200 GPa for those made with unidirectional fiber sheet. The choice of this material with a high elastic modulus-to-density ratio has a substantial impact on the ability to increase the resonant frequency of the mechanical path above 850 Hz, as described below. In addition, some carbon-carbon composite materials are available with extremely low density. For example the "Etan" material from Aerospace Composite Products has a density of 1.3 g/cm$^3$, approximately half that of aluminum, which has a density of around 2.7 g/cm$^3$. Since the optics block of the current invention hangs below the 3-dimensional flexure, the natural frequency of the flexure depends on the mass of the optics block. Therefore, by making the optics block from an extremely low density material the inventors were able to achieve a much higher natural frequency for the flexure than would be possible with a block made from metal. It is preferred that the density of the composite material be less than 5 g/cm$^3$, more preferably less than 2.0 g/cm$^3$, most preferably less than 1.5 g/cm$^3$.

The fiber volume content in relation to the unit of volume of the composite.

material is about 20 to 70%, preferably greater than 50%. A high fiber content per unit of volume, preferably in the range of 50% to 70% has the advantage that the result is a dense material with good embedding of the hard materials leading to a high grain-strength limit.

Carbon composite materials also have a very advantageous coefficient of thermal expansion. Most scanning probe microscopes suffer from the problem of "thermal drift." That is, the mechanical path between the probe and the sample or between the probe and the detection system changes as the temperature changes. If the mechanical path between the cantilever and sample changes length with temperature, this change appears as a change in the position of the surface of the sample, distorting any measurement made on the sample. This is a problem of thermal expansion or contraction of materials used in the mechanical path as the temperature changes. Most AFMs are made of metals like aluminum or stainless steel which have thermal expansion coefficients in the range of $10^{-5}$/° C. Some AFMs are made of Invar™, a metallic alloy designed to have a low coefficient of thermal expansion. Unfortunately, this material is expensive, difficult to machine, and rusts over time if not protected with an additional coating like nickel. This problem of the prior art AFMs is overcome by using composite materials, like carbon fiber composite. Depending on composition and the orientation of the fiber axes, carbon composite materials can have a positive or negative coefficient of thermal expansion. This allows the composition to be tuned to give a coefficient of thermal expansion very nearly zero. For the preferred embodiment, one can use a carbon-carbon composite with a coefficient of thermal expansion of less than $5 \times 10^{-6}$/° C., most preferably $10^{-6}$/° C., which is approximately ten times better than aluminum or steel.

The carbon-carbon composite of the preferred embodiment also can be directly drilled and tapped to hold the various adjustment screws used in a measurement head, for example the fine-pitch screws used to position the focused spot. The inventors have machined internal threads into the carbon-carbon composite with a pitch up to 200 threads per inch. The carbon-carbon composite material also has the property that it is somewhat self-clamping and self-lubricating. Specifically what this means is that when an adjustment screw is first turned there is a fairly strong frictional force holding it in place. Once the motion is initiated, the screw can be adjusted quite smoothly with high precision. But when the screw is left alone, the carbon-carbon composite material relaxes again and clamps down on the screw threads, holding the adjustment screw firmly in place.

The use of a composite material benefits many other components of an AFM. For example, the scanner housing 79 of FIG. 9 may also be made of a composite material, resulting in higher stability and noise rejection.

Other materials that have high stiffness and low thermal expansion coefficients, such as ceramics, would also be useful materials for scanning microscope heads. Thus, fibers of the fiber structure can be made of non-oxidic, ceramic fibers, such as silicon carbide and/or silicon nitride or of fiber systems that contain silicon, boron, carbon, and nitrogen.

Although the housing is shown as composed of two pieces, it can be formed of one piece or of many pieces fastened together with adhesive or fasteners, depending on ease of fabrication and other considerations. Various other three dimensional micro positioners might be used to position the unified optics block.

V. The Beam Never Hits a Flat Surface at Normal Incidence.

A novel feature of the optical system of the present invention is that the beam 14, 20, 26 from the light source 16 never hits a flat surface at normal incidence except when it is strongly diverging or converging as in the case where a fluid cell is between the objective lens 22 and the cantilever 24. Even the detector 34, at the end of the optical path, is angled away from normal to the reflected beam 26. In the case the light source 16 is a laser or laser-like source, this avoids the establishment of an optical cavity with deleterious feedback effects on the performance of the light source 16.

VI. Critical Mechanical Paths have Resonant Frequencies Greater than 850 Hz.

Figure 10A:
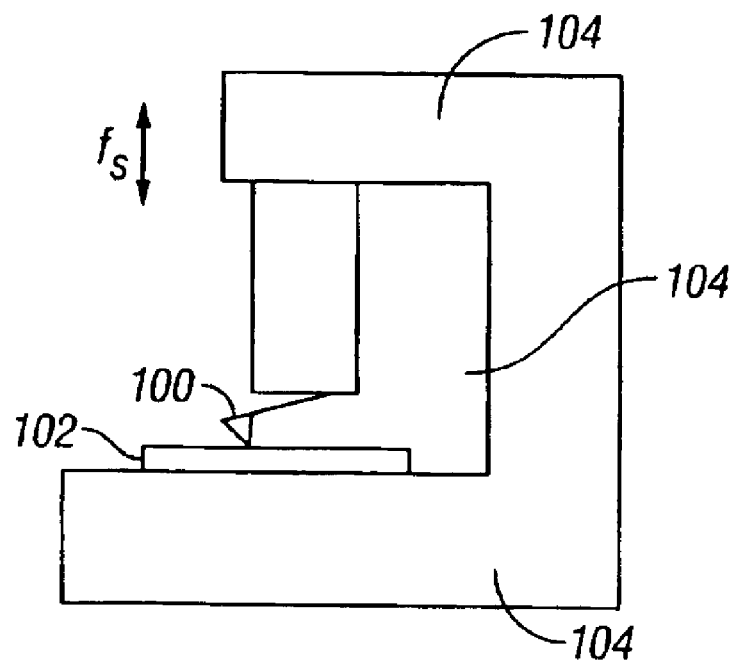
FIGS. 10A and 10B are simplified schematic diagrams of the mechanical path between the cantilever and the sample.

Another novel feature of this microscope is a resonant frequency of the mechanical paths between the cantilever and the sample and the cantilever and the detection system greater than 850 HZ. FIG. 10A shows a simplified schematic diagram of a typical mechanical path between the cantilever (or other scanning probe) 100 and the sample 102. The mechanical path will consist of one or more structural units 104 shown schematically in FIG. 10A. This structure may have an arbitrary shape, but it will have one or more normal modes of motion that cause the distance between the cantilever and sample to change. If these modes of motion are excited by an external source of acoustic or vibrational energy, the cantilever and sample will move relative to each other. Since the cantilever is intended to track the structure or other properties of the sample, unwanted motion between the cantilever and sample is directly superimposed on the desired signal, acting as interfering noise to disrupt or degrade the measurement of the true cantilever motion.

There is a second important mechanical path in a scanning probe microscope—the path between the cantilever (or other probe) and the detection system. This mechanical path is shown in a simplified schematic diagram in FIG. 10B. In this figure, the critical mechanical path is composed of the structures 106 that are interposed between the cantilever or other probe 100 and the detection system 108 used to measure the position or motion of the probe 100. In the case of the measurement head of the current invention, this is the path between the focused spot of the light beam the cantilever. Any oscillation mode that causes a relative tilt between the cantilever and the light beam also superimposes directly on the measured signal, causing similar disruption or degradation of the measurement of the cantilever motion.

In general, the higher the resonant frequency of these mechanical paths, the more immune the device is to external vibration. For an external noise source that is at a much lower frequency than the resonance of the structure, the noise is attenuated by the ratio $(f_s/f_n)^2$. For example, imagine a source of mechanical oscillation interference at 200 Hz. If the natural frequency of the mechanical path is 800 Hz, the attenuation of this interference will be $(800/200)^2=16$. Yet, if the resonant frequency of the critical mechanical path is pushed from 800 Hz to 1200 Hz, the attenuation ratio goes to $(1200/200)^2=36$. And if the resonant frequency of the structure can be made 10,000 Hz, the attenuation factor goes to 2500! This concept is detailed further in a publication "Assessing the quality of scanning probe microscope designs," by James Thompson et al, *Nanotechnology* 12(2001) 394–397. This publication also outlines an experimental method to measure the resonant frequency of an AFM measurement system and the "vibration rejection ratio." The technique of this publication is not part of the current invention, but some of its analysis and measurement techniques were used to confirm the improved performance of the measurement heads of the current invention.

Figure 10B:
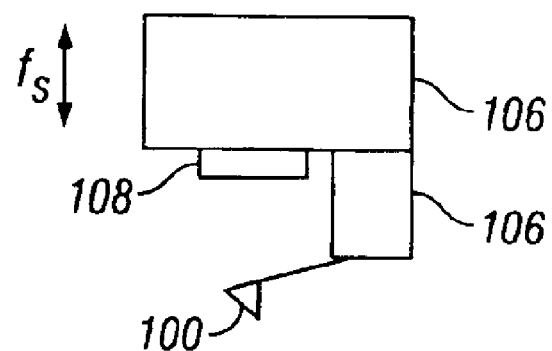

The current invention achieves higher resonant frequencies of these critical mechanical paths than prior art AFMs, specifically exceeding 850 Hz for one or both of the mechanical paths shown in FIGS. 10A and 10B. First, the choice of material is a key advantage. The natural frequency of a normal mode of oscillation is often a complex function of the geometry of the structure, but usually has a simple dependence on the term $(E/\rho)^{1/2}$, where E is the elastic modulus of the material and $\rho$ is its density. Most AFMs are constructed from metals, like aluminum, stainless steel, Invar, and even titanium. Surprisingly, all of these materials have a very similar value for $E/\rho$ of about $2.6\times10^7$ m$^2$/s$^2$, Consider, for example typical carbon-carbon composite material may have an elastic modulus of 100 GPa and a density of 1800 kg/in$^3$. The carbon fiber composite material described above has a value for $E/\rho$ of $5.5\times10^7$ m$^2$/s$^2$. Thus, for the exact same structure, the natural frequency of an AFM head made of carbon fiber composite can be two times or more better than the commonly used metal materials.

Using this carbon composite material, the inventors have built AFM measurement heads with resonant frequencies in excess of 850 Hz. One embodiment, built to mount in place of the "MultiMode AFM" head manufactured by Digital Instruments/Veeco Metrology, has a mechanical resonance of approximately 1200 Hz, compared to roughly 800 Hz of the standard MultiMode AFM head. The natural frequencies of a mechanical path scale with the dimensions of the components of the path. That is, structures with smaller dimensions will have larger the natural frequencies (assuming the same material). With this in mind, the inventors have made other measurement heads much smaller than the version of the AFM head for the MultiMode AFM. For example, one embodiment of the invention has been built out of carbon composite material that has a first mechanical resonance of roughly 23 kHz.

As previously mentioned, the measurements of the resonant frequencies was confirmed using the method of the Thompson paper and/or using DesignSpace™ finite element analysis software on the Solid Edge™ computer models used to design the measurement heads.

Figure 7:
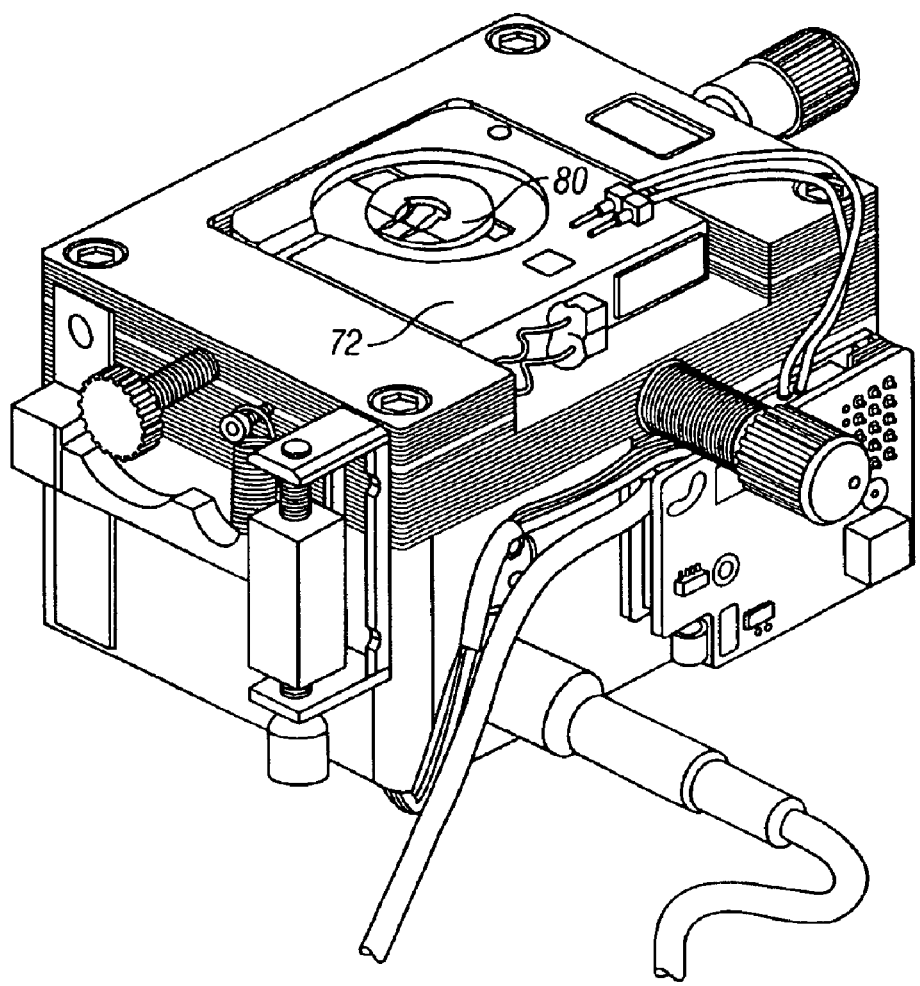
FIG. 7 is a bottom perspective view of the AFM head showing the location of a fluid cell containing the AFM cantilever.
Figure 8:
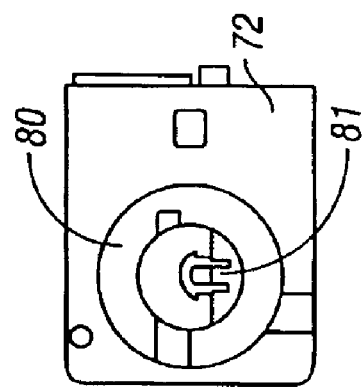
FIG. 8 is a bottom perspective view of the AFM head showing the fluid cell separated from the AFM housing.
Figure 8:
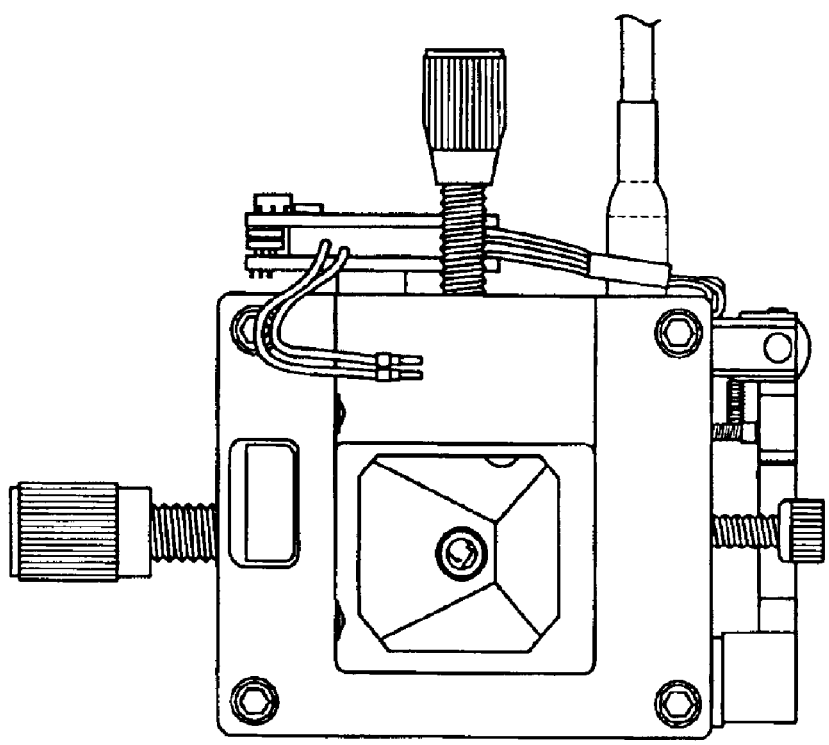
Figure 9:
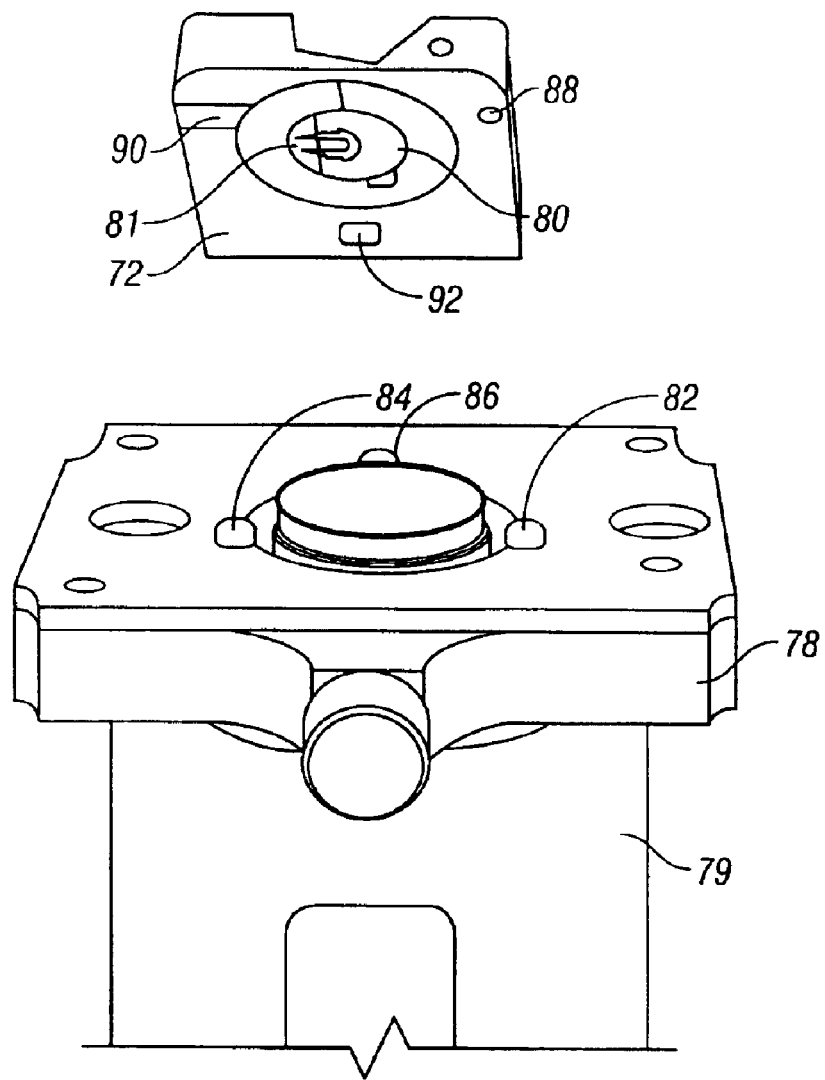
FIG. 9 is a perspective view showing the bottom of the fluid cell of FIG. 8 and opposing surface of a scanner, illustrating the direct kinematic indexing of the fluid cell to the scanner.

The present invention implements an number of other improvements that also help improve the resonant frequencies of the mechanical paths. Referring to FIGS. 7–9, in the preferred embodiment the cantilever holder 72 is kinematically indexed directly to the top of the scanner 78. In this embodiment, the cantilever holder 72 incorporates a fluid cell 80 in which the cantilever 24 is located. As shown in FIG. 9, three steel bearing balls 82, 84, and 86 are affixed to the top surface of the scanner 78, indexed respectively to a hole 88, a groove 90, and a flat 92 on the confronting surface of the cantilever holder 72. The result is a direct kinematic mount, such as in FIG. 9 of U.S. Pat. No. B1 Re 34,389 or in FIG. 9 of U.S. Pat. No. 5,825,020. This differs, however, from the cited previous designs because in the previous designs the shell was connected to the scanner through such a kinematic mount and the cantilever holder was attached to the shell with such a kinematic mount or other kinematic mount, such as three grooves pointed at a slot near the center of the mount with three balls on the mating part. The new design removes one kinematic mount between the scanner and cantilever so that the cantilever holder 72 is kinematically indexed directly to the scanner 78.

This arrangement gives a more direct mechanical path between the sample on top of the scanner and the cantilever, providing an increased resonant frequency, which helps to insulate the microscope from vibrations. In accordance with an embodiment of the present invention, there is thus provided the first atomic force microscope with an effective resonant frequency of vibration of cantilever relative to the sample and to the focused spot greater than 850 Hz.

This more direct path is used to incorporate an optional, removable, x-y translator that translates the cantilever holder relative to the sample to access different regions on the sample. For a further improved embodiment of the present invention, this translator could be built directly on the scanner assembly, thus eliminating a kinematic mount.

VII. The Incident Beam Forms a 5 µm or Less Spot.

In the preferred embodiment, a single element aspheric objective lens 22 is used. For example, the inventors have used an aspheric lens with a focal length of 2.72 mm manufactured by Geltech A variety of such lenses are available, and aspheric lenses can also be custom designed and manufactured to meet specific performance goals. This aspheric lens allows high numerical aperture and diffraction-limited performance in a small package. It is small, lightweight, and resistant to thermal drift. To achieve diffraction limited performance, it eliminates or substantially reduces optical aberrations present in other lenses commonly used in AFM. A multi-element objective lens system can also be used. With a spherical surface lens aberrations can be further reduced by adding an aperture in front of the lens to restrict the active area of the lens to a smaller region on the surface of the lens. As a result of the use of one or more of the above improvements, an AFM can be constructed wherein the incident beam 20 can be focused to a width of 5 µm or less, preferably 3 µm or less, for example having a width of 3 µm and length of 10 µm. These light spot dimensions were determined and optimized using the optical design program Zemax(™) which provides analysis tools to determine the RMS spot radius of the focused beam. The widths quoted above come from the analysis function called "FFT PSF Cross-section," an analysis that calculates the point spread function for a focused laser spot including both geometric and diffraction effects. The widths quoted are full-widths at the points where the light amplitude is 10% of the peak amplitude. The lens that we used from Geltech was designed for DVD players. It just worked acceptably in the very different application to an AFM head because the optical properties of the air gap and plastic between the lens and the focus in the DVD player were similar to the air gap and air or fluid between the lens and focus for our AFM head. Improved performance could be obtained with a custom aspheric objective. Such a custom objective could be designed with Zemax or other optical design program. This head has been used in this invention as a force spectrometer to measure the force vs. extension curves on bone proteins. With a cantilever with dimensions 3 µm wide by 15 µm, long, t resonant frequency 100 kHz, Q≈1.3 in water, spring constant 20 pN/nm, a force noise was obtained of order 3 pN rms with a cantilever with a spring constant of 0.06 N/m in a 60 kHz bandwidth. Force events as small as 3 pN were able to be measured.

Additional Embodiments

In further embodiment of the present invention, the objective lens 22 can be mounted on a flexure similar to the laser positioning flexure 46, and focused with a screw similar to the screw 50.

The objective lens 22 has been described as mounted in a threaded sleeve 81 that is threaded into a lens mount 83 that is glued into the optics block 40. As discussed above, this provides a coarse focus. In the flexure 52 mounting herein, a similar coarse focus can optionally be provided.

In still another embodiment of this invention, the cantilever is moved rather than the optics block. What matters is adjustable, relative motion of the focused spot and the cantilever.

Thus, the scope of the present application is not intended to be limited to the particular embodiments of the invention as described. As one of ordinary skill in the art will readily appreciate from the disclosure of the present invention, means presently existing or later to be developed that perform substantially the same function or achieve substantially the same result as means used in the embodiments described herein may be utilized according to the present invention. Accordingly, the invention is intended to include such means within its scope.

What is claimed is:

1. In a measurement head having a housing, a cantilever that can be positioned over a sample, and an optical system to direct a light beam from a light source as an incident beam on the surface of the cantilever, and as a reflected beam from the cantilever to an optical detector, the improvement comprising at least one of the following:
    (a) a lens for focusing the incident beam onto said cantilever wherein the central axis of said incident beam is offset from the central axis of the reflected beam and each is offset from the central axis of said focusing lens;
    (b) an integral optics block containing said optical system is provided in said housing, and a flexure is provided mounting the optics block to the housing while allowing the optics block to be translated along the axis of the light beam from the light source;
    (c) said housing and optics block are formed of composite material or of a ceramic, having the stiffness, low thermal expansion, or both, of a ceramic; or
    (d) the resonant frequency of vibration of a mechanical path between the cantilever and a sample or between the cantilever and the focusing lens system is greater than about 850 Hz.

2. An atomic force microscope, comprising:
    a housing;
    a cantilever that can be positioned over a sample;
    an optical system for measuring deflection of the cantilever in which a light beam is focused by a lens to a spot on the cantilever; and
    wherein the resonant frequency of a mechanical path between the cantilever and said sample or between the cantilever and said focusing lens is greater than about 850 Hz.

3. The atomic force microscope of claim 2 further comprising:
    a scanner for supporting the sample for the cantilever; and
    a cantilever holder connected to said housing and kinematically indexed directly to said scanner.

4. The atomic force microscope of claim 2 wherein the resonant frequency of at least one of said mechanical paths is greater than 5 kHz.

5. The atomic force microscope of claim 2 wherein the resonant frequency of at least one of said mechanical paths is greater than 10 kHz.

6. The atomic force microscope of claim 2 wherein the resonant frequency of at least one of said mechanical paths is greater than 20 kHz.

7. The atomic force microscope of claim 2 wherein the resonant frequency of at least one of said mechanical paths is greater than 2 kHz.

8. In a method for operating an atomic force microscope having a housing and an optical system to direct a light beam from a light source as an incident beam to the surface of a cantilever, and as a reflected beam from the cantilever to an optical detector, the improvement comprising at least one of the following steps:
    (a) passing the incident beam through a first region of a lens to focus the incident beam onto the cantilever and passing the reflected beam through a second region of the lens to direct the reflected beam to the detector, wherein said incident beam is offset from the central axis of the reflected beam and each is offset from the central axis of said focusing lens;
    (b) providing said optical system in an integral optics block in said housing and mounting the optics block to the housing using a flexure that allows the optics block to be translated along the axis of the light beam from the light source; or (c) providing a cantilever holder for said cantilever and a scanner for supporting a sample for said cantilever; and directly kinematically mounting said cantilever holder on said scanner, whereby the resonant frequency of vibration of a mechanical path between said cantilever and a sample and/or the mechanical path between said cantilever and said focusing lens is greater than about 850 Hz.

9. In a method for operating an atomic force microscope having a housing and an optical system to direct a light beam from a light source as an incident beam to the surface of a cantilever, and as a reflected beam from the cantilever to an optical detector, the improvement comprising providing a cantilever holder for said cantilever and a scanner for supporting a sample for said cantilever; and directly kinematically mounting said cantilever holder on said scanner, whereby the resonant frequency of vibration of the mechanical path between said cantilever and said sample and/or the mechanical path between the cantilever and a detection system is greater than about 850 Hz.

10. The method of claim 9 wherein the resonant frequency of at least one of said mechanical paths is greater than 2 kHz.

11. The method of claim 9 wherein the resonant frequency of at least one of said mechanical paths is greater than 5 kHz.

12. The method of claim 9 wherein the resonant frequency of at least one of said mechanical paths is greater than 10 kHz.

13. The method of claim 9 wherein the resonant frequency of at least one of said mechanical paths is greater than 20 kHz.

14. In a method of operating a measurement head to measure the motion or position of a nanomechanical object or a nano size feature of an object, the improvement comprising the steps of constructing a mechanical path between a detection system and said nanomechanical object or nano size feature of an object such that the resonant frequency of vibration of said mechanical path is greater than 850 Hz.

15. The method of claim 14 wherein the resonant frequency of at least one of said mechanical paths is greater than 2 kHz.

16. The method of claim 14 wherein the resonant frequency of at least one of said mechanical paths is greater than 5 kHz.

17. The method of claim 14 wherein the resonant frequency of at least one of said mechanical paths is greater than 10 kHz.

18. The method of claim 14 wherein the resonant frequency of at least one of said mechanical paths is greater than 20 kHz.

19. In a method of operating a measurement head to measure the interaction between a nanomechanical object or a nano size feature of an object and a sample, the improvement comprising the steps of constructing a mechanical path between the sample and said nanomechanical object such that the resonant frequency of vibration of said mechanical path is greater than 850 Hz.

20. The method of claim 19 wherein the resonant frequency of at least one of said mechanical paths is greater than 2 kHz.

21. The method of claim 19 wherein the resonant frequency of at least one of said mechanical paths is greater than 5 kHz.

22. The method of claim 19 wherein the resonant frequency of at least one of said mechanical paths is greater than 10 kHz.

23. The method of claim 19 wherein the resonant frequency of at least one of said mechanical paths is greater than 20 kHz.

* * * * *